United States Patent [19]

Ushio et al.

[11] Patent Number: 4,898,661

[45] Date of Patent: Feb. 6, 1990

[54] METHOD FOR DEWAXING HYDROCARBON OIL EMPLOYING CRYSTALLINE ALUMINOSILICATES PROMOTED WITH A SOLID FLUORINE COMPOUND

[75] Inventors: Masaru Ushio, Yokohama; Hajime Okazaki, Kawasaki, both of Japan

[73] Assignee: Nippon Oil Co., Ltd., Japan

[21] Appl. No.: 79,233

[22] Filed: Jul. 29, 1987

Related U.S. Application Data

[63] Continuation-in-part of Ser. No. 788,242, Oct. 17, 1985, abandoned.

[30] Foreign Application Priority Data

Oct. 18, 1984 [JP] Japan ................. 59-218847

[51] Int. Cl.$^4$ ................. C10G 35/08; C10G 11/08
[52] U.S. Cl. ................. 208/117; 208/116; 208/120; 208/111; 502/231
[58] Field of Search ............... 208/109, 111, 120, 118, 208/117, 119, 115, 116; 423/328, 329; 502/231, 71, 152, 86

[56] References Cited

U.S. PATENT DOCUMENTS

| | | | |
|---|---|---|---|
| 3,562,148 | 2/1975 | Mitsche | 502/231 X |
| 3,838,040 | 9/1974 | Ward | 208/111 |
| 4,139,600 | 2/1979 | Rollmann et al. | 502/62 X |
| 4,427,788 | 1/1984 | Miale et al. | 502/71 |
| 4,438,215 | 3/1984 | Dessau et al. | 502/71 |
| 4,444,902 | 4/1984 | Chang et al. | 502/86 |
| 4,495,061 | 1/1985 | Mayer et al. | 208/111 |
| 4,526,879 | 7/1985 | Dwyer et al. | 502/71 |
| 4,530,756 | 7/1985 | Chang et al. | 208/111 |
| 4,548,705 | 10/1985 | Young et al. | 208/111 |

FOREIGN PATENT DOCUMENTS 0205634 1/1984 Fed. Rep. of Germany ........ 502/71

*Primary Examiner*—Glenn Caldarola
*Attorney, Agent, or Firm*—Ostrolenk, Faber, Gerb & Soffen

[57] ABSTRACT

The present invention is directed to a method for dewaxing hydrocarbon oil which is characterized by bringing the hydrocarbon oil into contact with a catalyst which is prepared by mixing specific crystalline aluminosilicate, defined in claim 1, having an $SiO_2/Al_2O_3$ molar ratio between 12 and less than 70 with at least one solid fluorine compound selected from aluminum fluoride, ammonium fluoride, zinc fluoride, cadmium fluoride, manganese fluoride, chromium fluoride, tin fluoride, copper fluoride and silver fluoride; molding the resulting mixture into an optional shape; and calcining the molded mixture at a temperature of 100° to 700° C. for a time of 0.5 hour or more.

18 Claims, No Drawings

METHOD FOR DEWAXING HYDROCARBON OIL EMPLOYING CRYSTALLINE ALUMINOSILICATES PROMOTED WITH A SOLID FLUORINE COMPOUND

CROSS-REFERENCE TO RELATED APPLICATION

This is a continuation-in-part application of U.S. Ser. No. 788,242 now abandoned.

BACKGROUND OF THE INVENTION (1) Field of the Invention

This invention relates to a method for catalytically dewaxing hydrocarbon oil, and more particularly to a method for producing hydrocarbon oil of good flowability by thermally contacting such hydrocarbon oil represented by petroleum fraction with zeolite system catalyst.

(2) Description of the Prior Art

Recently, demand for B and C heavy fuel oils has been reduced, though that for so-called middle distillate involving kerosene, gas oil, and A heavy fuel oil has been increased. As a manner for responding to such demand, there is a method wherein the end point in the distillation test of gas oil fraction has been set higher, whereby yield of gas oil is elevated. In this case, however, the pour point thereof rises also with the increase in the end point, so that problems arise in the properties of the product. In this connection, it becomes necessary for providing such a process that the pour point of the gas oil fraction having a high pour point thus obtained is made to decrease to use the same as a compounding ingredient for gas oil or A heavy fuel oil.

On the other hand, there is an increasing demand for a lubricating oil fraction having a low pour point and a low viscosity as a base oil for insulating oil, refrigerating oil, hydraulic oil and the like.

These oils have heretofore been obtained by fractional distillation or purification of naphthenic crude oil of low wax content, but the remarkable demand for the former oils continues to expand so that there is a necessity of searching for other sources of the raw material.

Lubricating oil fraction having the above mentioned property may be obtained from abundant paraffinic crude oil in accordance with the solvent dewaxing method, but such manner involves a problem from viewpoint of cost so that a more inexpensive method is desired.

In addition, when this solvent dewaxing method is used, the pour point of the obtained base oil for lubricating oil is within the range of about $-34°$ C. to about $0°$ C. Therefore, the solvent dewaxing method cannot substantially manufacture the specific lubricating oil in which a lower pour point than $-34°$ C. is required, under mild conditions and at a low energy cost.

In view of the above, various catalytic dewaxing methods have been proposed as those for lowering pour point of hydrocarbon fraction.

For example, there are disclosed Japanese Patent Publication No. 31856/1970 wherein mordenite is used as the catalyst, Patent Publication Nos. 30463/1970 and 7764/1972 in which type A zeolite is utilized as their catalysts, Patent Publication No. 32723/1972 wherein erionite is used as the catalyst, and Patent Publication No. 34444/1974 in which ZSM-5 zeolite is used as the catalyst, respectively. However, these prior art methods involve such disadvantages of not so high recovery, short catalyst life and the like. Thus, development for such catalysts having high selectivity and long life is desired.

Further, in order to use a dewaxed oil as the base oil for lubricating oil, it is required that the dewaxed oil is excellent in viscosity index, oxidation stability and the like. In this point, the conventional catalytic dewaxing techniques cannot provide the base oil for lubricating oil having a sufficiently satisfactory performance, and hence it is demanded to eliminate this drawback through the development of catalysts.

OBJECT OF THE INVENTION

The present invention has been made to eliminate the disadvantages of the conventional methods as described above, and an object of the invention is to stably produce dewaxed oil in high yield for a long period of time by utilizing such catalyst where excessive cracking activity of which has been suppressed, and has high selectivity and long life.

SUMMARY OF THE INVENTION

The present invention relates to a method for dewaxing hydrocarbon oil which is characterized by bringing the hydrocarbon oil into contact with a catalyst which is prepared by mixing crystalline aluminosilicate having an $SiO_2/Al_2O_3$ molar ratio between 12 and less than 70 with at least one solid fluorine compound selected from aluminum fluoride, ammonium fluoride, zinc fluoride, cadmium fluoride, manganese fluoride, chromium fluoride, tin fluoride, copper fluoride and silver fluoride; molding the resulting mixture into an optional shape; and calcining the molded mixture at a temperature of $100°$ to $700°$ C. for a time of 0.5 hour or more; said crystalline aluminosilicate being obtained by exposing a gelled reaction mixture consisting of a silica source, an alumina source, an alkali source, water and an organic compound in the molar composition ratio $SiO_2/Al_2O_3 = 10$ to $100$ $H_2O/SiO_2 = 5$ to $100$ $OH^-/SiO_2 = 0.01$ to $1.0$ $R/Al_2O_3 \geq 0.05$ wherein R is said organic compound, to hydrothermal synthetic conditions at a reaction temperature of $50°$ to $300°$ C. for a reaction time of 3 hours to 1 month.

DETAILED DESCRIPTION OF THE INVENTION

Examples of the silica source used in the present invention include silica gel, silica aerogel, silica hydrogel, silicic acid, silicate ester, sodium silicate and the like.

Examples of the alumina source include sodium aluminate, aluminum sulfate, aluminum nitrate, alumina sol, alumina gel, activated alumina, α-alumina, γ-alumina and the like.

As the alkali source, caustic soda, caustic potash, caustic lithium and the like may be used, and preferable is caustic soda.

Such alkali source is preferably added in such that $OH^{31}$ ion concentration exists in said gelled reaction mixture with said ratio of composition.

The organic compound may be one having one or more hydrophilic functional groups in its molecule.

Examples of such organic compound include alcohols, organic amines, quarternary alkyl ammonium salts, carboxylic acids, ketones, amides, imides, esters, thiols and the like. These organic compounds may contain two or more of different functional groups.

(I) Examples of the alcohols include monoalcohols such as methanol, ethanol, t-butanol and the like; diols such as ethylene glycol and the like; and triols such as glycerin and the like.

(II) Examples of the organic amines include primary amines such as n-propylamine, monoethanol amine and the like; secondary amines such as dipropylamine, diethanolamine and the like, and tertiary amines such as tripropylamine, triethanolamine and the like.

(III) Examples of the quarternary alkylammonium salts include tetrapropylammonium bromide, tetramethylammonium bromide, tetraethylammonium bromide, tetrapropylammonium chloride, tetrabutylammonium bromide, tetrabutylammonium chloride and the like.

(IV) Examples of the carboxylic acids include tartaric acid, succinic acid, citric acid, toluic acid, salicylic acid and the like.

(V) Examples of ketones include methyl ethyl ketone, diethyl ketone, diisobutyl ketone and the like.

(VI) Examples of the amides include acetamide and the like.

(VII) Examples of the imides include acetyl imide, succinic imide and the like.

(VIII) Examples of the esters include ethyl acetate, isoamyl acetate, ethyl acrylate and the like.

(IX) Examples of the thiols include ethyl mercaptan, methane thiol, 1-propane thiol, 1-butane thiol and the like.

The water-soluble reaction mixture prepared from the silica source, the alumina source, the alkali source, water and the organic compound in said molar ratio is placed in a closed vessel, for example, stainless steel autoclave to crystallize it. The hydrothermal synthetic condition for crystallization is such that the reaction temperature is of 50° to 300° C., and preferably 100° to 200° C., and the reaction time is three hours to one month, and preferably five hours to five days. It is desirable to maintain the reaction mixture in a homogeneous state by agitating continuously or periodically during the crystallization. The crystallized material produced in accordance with the hydrothermal synthetic reaction is taken out from the closed vessel, washed with water, filtered, and dried. Typical X-ray diffraction patterns of the crystalline aluminosilicate thus synthesized are specified in the following Table 1.

TABLE 1

| X-Ray Diffraction of Zeolite Powder | | |
|---|---|---|
| $2\theta$ (degree) | Lattice Plane Distance d(A) | Relative Strength |
| 7.76 | 11.36 | strong |
| 8.67 | 10.20 | moderately strong |
| 8.93 | 9.90 | |
| 9.68 | 9.14 | very weak |
| 11.73 | 7.54 | weak |
| 12.34 | 7.17 | weak |
| 13.03 | 6.79 | very weak |
| 14.61 | 6.06 | weak |
| 15.36 | 5.77 | weak |
| 15.73 | 5.63 | weak |
| 16.35 | 5.42 | very weak |
| 17.08 | 5.19 | very weak |
| 17.56 | 5.05 | weak |
| 19.03 | 4.65 | weak |
| 20.19 | 4.40 | weak |

TABLE 1-continued

| X-Ray Diffraction of Zeolite Powder | | |
|---|---|---|
| $2\theta$ (degree) | Lattice Plane Distance d(A) | Relative Strength |
| 20.68 | 4.30 | weak |
| 21.59 | 4.12 | very weak |
| 22.01 | 4.04 | very weak |
| 22.96 | 3.87 | |
| 23.14 | 3.84 | very strong |
| 23.60 | 3.77 | |
| 23.77 | 3.74 | very strong |
| 24.58 | 3.62 | strong |
| 25.44 | 3.50 | weak |
| 25.71 | 3.46 | weak |
| 26.75 | 3.33 | weak |
| 27.26 | 3.27 | very weak |
| 29.11 | 3.07 | weak |
| 29.76 | 3.00 | moderate |

The crystalline aluminosilicate thus synthesized does not exhibit any solid acidity without modification. The dewaxing reaction according to the present invention is an acid catalyst reaction. Thus, it is required that ratio of the alkali in said crystalline aluminosilicate be reduced by subjecting the same to dealkalization with the use of acid, ammonium salt or the like in order to utilize said crystalline aluminosilicate as the catalyst in the method according to the present invention.

With respect to degree of dealkalization, it is preferable to remove 50 mol % or more or alkali metal or alkaline earth metal from said crystalline aluminosilicate, and particularly preferable is to remove 90 mol % or more of such metal. In this case, examples of dealkalizing agent include mineral acids such as hydrochloric acid, sulfuric acid, nitric acid, phosphoric acid and the like; water-soluble organic acids such as formic acid, acetic acid, malic acid and the like; and ammonium salts such as ammonium chloride, ammonium nitrate and the like, and preferably used is hydrochloric acid, nitric acid, ammonium chloride, and ammonium sulfate. These acids or salts may be used along or in admixture.

These acids or salts are used in the form of an aqueous solution. The acid concentration in this case depends upon processing conditions, but preferable is 1 to 6N, and when ammonium salt is used, the concentration is 1 to 30%, and preferably 5 to 15%. The processing temperature may be room temperature, but heating ranging from 80° to 100° C. is preferable to shorten such processing time. Because processing time depends upon temperature, it cannot be absolutely said, but generally a processing time of 5 hours to three days is preferable.

Examples of the fluoride used in the present invention include aluminum fluoride, ammonium fluoride, zinc fluoride, cadmium fluoride, manganese fluoride, chromium fluoride, tin fluoride, copper fluoride, silver fluoride and the like.

Among others, particularly preferable are aluminum fluoride and ammonium fluoride. They may be used singly or in combination with one or more of said fluoride compounds.

Preferable examples of aluminum fluoride include aluminum trifluoride hydrate prepared in accordance with processes described, for example, in E. Baud, "Ann. Chim. Phrs.", (8) 1, 60 (1904); A. Mazzuchelli, "Atti Accad Lincei.", (5) 16i, 775 (1907); W. F. Fhret and F. T. Frere, "J. Am. Chem. Soc.", 67, 64 (1945) and the like, and basic aluminum fluoride prepared according to processes disclosed in J. M. Cowley and T. R. Scott, "J. Am. Chem. Soc.", 70, 105 (1948); as well as R.

L. Johnson and B. Siegel, "Nature", 210, 1256 (1966), respectively.

Particularly, α-AlF$_3$, .3H$_2$O, β-AlF$_3$.3H$_2$O, and such aluminum fluorides obtained by calcining these compounds at a temperature of 700° C. or less, and preferably 200° to 500° C. are preferably utilized. Furthermore, such aluminum fluorides which are similarly effective to those mentioned above are prepared by either passing excess anhydrous hydrogen fluoride through a reaction tube charged with alumina, aluminum hydroxide, or the mixture thereof at a temperature of 200° to 500° C., or passing excess anhydrous hydrogen fluoride through a reaction tube charged with aluminum chloride at a temperature of 20° to 400° C. In the case where these aluminum fluorides are prepared as a component of the catalyst in the method according to the present invention, it is not necessarily required that they are purely prepared to use them, but those obtained as a mixture thereof are sufficient for such purpose.

In general, commercially available fluoride ammonium (NH$_4$F) is sufficient for use in the method of the present invention. In place of ammonium fluoride, acid ammonium fluoride may be utilized.

The binary system catalyst according to the present invention may be prepared by admixing such dealkalized crystalline aluminosilicate which has been subjected to acid treatment, then washed sufficiently with water, and dried usually at a temperature of 50° to 200° C. for 0.5 to 8 hours with a fluoride compound, thereafter molding the admixture into a material having a suitable shape such as powder, granule (1 to 5 mmφ) or the like in accordance with, for example, compression molding, extrusion molding or the like, and calcining the material at a temperature of 100° to 700° C., and preferably 300° to 600° C. for 0.5 hour or more, and preferably 1.0 to 24 hours.

In order to elevate the strength of the molded material, a natural clay such as kaolin and the like, or a synthetic binder consisting of silica, alumina and the like may be added.

Generally, said calcination is carried out in the atmosphere, but it is, of course, also possible to effect the calcination in inert gas such as nitrogen gas, carbon dioxide gas and the like, or hydrogen gas.

In the present invention, one, two or more of metallic components having hydrogenation capability may also be supported on said catalyst as the tertiary component. By addition of such metallic component, the catalyst can further be improved in activity, selectivity, and life thereof.

Examples of said metallic component having hydrogenation capability include platinum, palladium, ruthenium, rhenium, nickel, rhodium, osmium, iridium, silver, copper, zinc, vanadium, chromium, iron, cobalt, cadmium, tin, manganese, tungsten, molybdenum, boron, titanium and gallium.

Said metallic component may be supported on the catalyst consisting of said crystalline aluminosilicate and said fluoride compound in accordance with a conventional method such as ion exchange method, dipping method or the like. After having been supported on the catalyst in accordance with any of the above methods, the supported catalyst is dried at a temperature of 50° to 250° C. for 0.5 hour or more, preferably 1 to 48 hours, and followed by calcination at a temperature of 300° to 700° C., preferably 400° to 600° C. for 0.5 hour or more, preferably 1 to 24 hours, whereby a fresh catalyst involving the tertiary component can be prepared.

Such supporting procedure may be effective before said dealkalized crystalline aluminosilicate is admixed with fluoride compound. For instance, as the extreme case said metal components can be added to the raw materials in the hydrothermal synthesis of the crystalline aluminosilicate. In binary system of the catalyst consisting of crystalline aluminosilicate and fluoride compound, the percentage composition of the catalyst according to the present invention is such that the dealkalized crystalline aluminosilicate is generally 20 to 99 wt %, preferably 40 to 90 wt %, and the fluoride compound is 1 to 80 wt %, preferably 5 to 60 wt %. Furthermore, in the ternary system of the catalyst consisting of crystalline aluminosilicate, fluoride compound, and metal having hydrogenation capability, the percentage composition of the catalyst of the present invention is such that the dealkalized crystalline aluminosilicate is usually 20 to 99 wt %, preferably 40 to 90 wt %, the fluoride compound is 1 to 80 wt %, preferably 10 to 60 wt %, and the content of the metallic component having hydrogenation capability is 0.05 to 30 wt %, preferably 1 to 10 wt %.

For this crystalline aluminosilicate, one having SiO$_2$/Al$_2$O$_3$ (molar ratio) of 10 to 300, preferably from 10 or more to less than 100 is utilized. This is because such a catalyst consisting of the crystalline aluminosilicate having the above stated range and a fluoride compound exhibits the longest life and high yield of dewaxed oil in dewaxing reaction of hydrocarbon fraction.

The catalyst prepared in accordance with the manner described above is used under the following reaction conditions. Namely, a reaction temperature is 1 to 100 kg/cm$^2$, preferably 20 to 50 kg/cm$^2$, liquid hourly space velocity (LHSV) which means contact time in the reaction is 0.1 to 10 hr$^{-1}$, preferably 0.5 to 5.0 hr$^{-1}$. In the present invention, the dewaxing reaction of hydrocarbon oil is preferably carried out in the presence of hydrogen gas. Hydrogen has principally a function of decreasing amount of carbon deposition. A ratio of hydrogen to hydrocarbon is 100 to 1,500 Nm$^3$/m$^3$, and preferably 200 to 800 Nm$^3$/m$^3$.

The hydrocarbon oil used in the method of the present invention means various hydrocarbon oils containing such wax components ranging from a comparatively light fraction to a high-boiling fraction. An example of the hydrocarbon oils includes crude oil, FCC cycle oil, FCC tower residue, gas oil, desulfurized gas oil, vacuum gas oil, desulfurized vacuum gas oil, vacuum residue, deasphalted residue, tar sand oil, oil sand oil or the like.

Further, with regard to the manufacture of a lubricating oil, a base oil for the lubricating oil can be manufactured stably for a long time in a high yield by dewaxing with the aid of a catalyst having a high selectivity and a long life, and in addition, the above-mentioned catalyst permits manufacturing a dewaxed oil which is excellent in performace as the base oil for the lubricating oil, for example, viscosity index (V.I.), oxidative stability and the like.

The dewaxing reaction in the present invention may be carried out in fixed bed, suspended bed or the like type of bed which have heretofore been publicly known, but fixed bed reaction is optimum in view of ease of operations and the like.

Since the catalyst used in the present invention is slow in coke deposition rate and high in selective cracking activity, a dewaxed oil can be stably produced at high yield for a long period of time, when used such catalyst.

EXAMPLES

The method of the present invention will be described in detail hereinafter in conjunction with specific examples.

Standard reaction conditions for dewaxing were as follows:

| | |
|---|---|
| Reaction Pressure (kg/cm$^2$G) | 40 |
| LHSV (hr$^{-1}$) | 2.0 |
| Hydrogen Flow Rate (SCF/bbl) | 2,000 |

The reaction temperature was set such that the pour point of 165° C. or more distilled oil was −15° C. In this connection, it is required to gradually raise the reaction temperature in order to keep such pour point constant, because the catalyst deteriorates with the lapse of reaction time, even if the same catalyst is used. As raw material oil, a desulfurized reduced pressure gas oil having the following property was employed.

| Distillation | 10% | 342° C. |
|---|---|---|
| | 50% | 370° C. |
| | 90% | 411° C. |
| Sulfur Content | 0.41 wt % | |
| Pour Point | | 18° C. |

COMPARATIVE EXAMPLE 1, EXAMPLE 1

Solution A was prepared from 6.48 g of aluminum sulfate Al$_2$(SO$_4$)$_3$·18H$_2$O, 18.6 g of concentrated sulfuric acid, 22.6 g of (n-C$_3$H$_7$)$_4$NBr, and 180 cc of water, whilst solution B was prepared from 207 g of water glass (SiO$_2$/NaOH/H$_2$O=29/9/62 in weight ratio) and 133 cc of water. Furthermore solution C was prepared by dissolving 78.8 g of sodium chloride into 313 cc of water. Both the solutions A and B were added little by little to solution C while sufficiently agitating them in such a manner that pH of the resulting mixed solution is within a range of 9.5 to 10.0 by adjusting the dropping amount, whereby an aqueous gelled mixture was obtained.

A stainless steel autoclave having 1-l internal volume was charged with the gelled mixture and sealed, thereafter heated and agitated at 150° C. for 16 hours.

A white powdery reaction product was filtered off and washed, thereafter dried at 120° C. for 5 hours, and further the reaction product thus treated was calcined at 500° C. for 5 hours. The X-ray diffraction diagram of the product after calcination had the same peak patterns as those of Table 1. As a result of analysis of composition of the product, the SiO$_2$/Al$_2$O$_3$ (molar ratio) was 80.

The zeolite powder thus obtained was warmed to 90° C. with 1N aqueous ammonium chloride solution, and the solution was subjected to ion exchange for 1 hour, filtered and washed, thereafter these operations were repeated three times. Then, the zeolite product was sufficiently washed with distilled water, and dried overnight at 120° C. The zeolite thus dealkalized was compression molded into pellets of 3×4 mmφ, and these pellets were calcined at 500° C. for 8 hours to obtain catalyst A. On one hand, catalyst B was prepared in accordance with such manner except that 10 wt % of aluminum trifluoride was added to and mixed with the same dealkalized zeolite described above, the mixture was compression molded into pellets of 3×4 mmφ, and these pellets were calcined at 500° C. for 8 hours.

A dewaxing reaction of desulfulized vacuum gas oil was effected under standard reaction conditions by the use of catalysts A and B.

The reaction temperature wherein pour point of 165° C. or more fraction in the 10th day after starting the reaction becomes −15° C., the yield of the 165° C. or more fraction, and the rate of reaction temperature rise required for maintaining said pour point were as follows:

| | Comparative Example 1 | Example 1 |
|---|---|---|
| Catalyst | A | B |
| Reaction Temperature (°C.) | 350 | 330 |
| Rate of Reaction Temperature (°C./day) | 5.0 | 3.0 |
| Yield of 165° C. or More Fraction (wt %) | 81.1 | 85.4 |

The composite catalyst B comprising the zeolite and aluminum trifluoride exhibits lower rate of reaction temperature rise for compensating the decrease in activity due to deposition of coke-like material and higher yield of 165° C. or more dewaxed oil than in the case where catalyst A is used. Thus, it is found that catalyst B has long life and is excellent in selectivity with respect to dewaxed oil.

COMPARATIVE EXAMPLE 2, EXAMPLE 2

9.22 g of solid caustic soda and 19.0 g of ethanol were dissolved into 344.2 g of water, to which was added 17.5 g of aqueous sodium aluminate solution to obtain a homogeneous solution. To this solution were gradually added 227.6 g of water glass (SiO$_2$/NaOH/H$_2$O=29/9/62 weight ratio) while agitating to obtain an aqueous gelled mixture. A stainless steel autoclave having 1-l internal volume was charged with the gelled mixture and sealed, and thereafter heated and agitated at 160° C. for 72 hours.

A white powdery reaction product was filtered off and washed, dried at 120° C. for 5 hours, and further the reaction product thus treated was calcined at 500° C. for 5 hours. The X-ray diffraction diagram of the product after calcination had the same peak patterns as those of Table 1.

As a result of analysis of composition of the product, the SiO$_2$/Al$_2$O$_3$ (molar ratio) was 28.

The zeolite powder thus obtained was subjected to ion exchange by using 1N hydrochloric acid at ordinary temperature for 1 hour, filtered and washed, and thereafter these operations were repeated three times. Then, the zeolite product was sufficiently washed with distilled water, and dried overnight at 120° C. The zeolite thus dealkalized was compression molded into pellets of 3×4 mmφ, and these pellets were calcined at 500° C. for 8 hours to obtain catalyst C. On one hand, catalyst D was prepared in accordance with such manner except that 10 wt % of ammonium fluoride were added to and admixed with the same dealkalized zeolite described above, the admixture was compression molded into pellets of 3×4 mmφ, and these pellets were calcined at 500° C. for 8 hours.

Dewaxing reaction of desulfulized vacuum gas oil was effected under standard reaction conditions by the use of catalysts C and D.

The reaction temperature wherein pour point of 165° C. or more fraction in the 10th day after starting the reaction becomes −15° C., yield of the 165° C. or more fraction, and the rate of reaction temperature rise required for maintaining said pour point were as follows.

|  | Comparative Example 2 | Example 2 |
|---|---|---|
| Catalyst | C | D |
| Reaction Temperature (°C.) | 335 | 335 |
| Rate of Reaction Temperature (°C./day) | 5.5 | 3.5 |
| Yield of 165° C. or More Fraction (wt %) | 80.5 | 84.3 |

The composite catalyst D comprising the zeolite and ammonium fluoride exhibits a lower rate of temperature rise and higher yield of 165° C. or more dewaxed oil than those of the case where catalyst C is used. Thus, it is found that catalyst D has long life and is excellent in selectivity with respect to dewaxed oil.

EXAMPLE 3

Desulfurized vacuum gas oil was dewaxed while flowing nitrogen in place of hydrogen in Example 1.

Such reaction temperature wherein pour point of 165° C. or more fraction in the 10th day after starting the reaction becomes −15° C., the yield of the 165° C. or more fraction, and the rate of reaction temperature rise required for maintaining said pour point were as follows.

|  | Example 3 | Example 1 (Reference) |
|---|---|---|
| Catalyst | B | B |
| Reaction Temperature (°C.) | 340 | 330 |
| Rate of Reaction Temperature (°C./day) | 4.0 | 3.0 |
| Yield of 165° C. or More Fraction (wt %) | 86.1 | 85.4 |
| Gas | Nitrogen | Hydrogen |

It is found that when hydrogen gas is replaced by nitrogen gas, the catalyst life is shortened, but yield of the dewaxed oil becomes somewhat better.

EXAMPLE 4

Catalyst B of Example 1 was dipped into aqueous silver nitrate solution so as to contain 5 wt % of metallic silver, and thereafter the catalyst B thus dipped was dried at 120° C. for 8 hours, and calcined at 500° C. for 8 hours to obtain catalyst E.

Dewaxing reaction of desulfulized vacuum gas oil was effected under standard reaction conditions by the use of catalyst E.

The reaction temperature wherein pour point of 165° C. or more fraction in the 10th day after starting the reaction becomes −15° C., the yield of 65° C. or more fraction, and the rate of reaction temperature rise required for maintaining said pour point were as follows.

|  | Example 4 | Example 1 (Reference) |
|---|---|---|
| Catalyst | E | B |
| Reaction Temperature (°C.) | 325 | 330 |
| Rate of Reaction Temperature (°C./day) | 2.5 | 3.0 |
| Yield of 165° C. or | 82.7 | 85.4 |

When silver having hydrogenation capability is supported on the catalyst, the catalyst life becomes longer, but yield of the dewaxed oil decreases.

COMPARATIVE EXAMPLE 3, EXAMPLE 5

Solution A was prepared from 49.0 g of aluminum sulfate $Al_2(SO_4)_3 \cdot 18H_2O$, 70.0 g of concentrated sulfuric acid, 48 g of $(n-C_3H_7)_4NBr$, and 710 cc of water, whilst solution B was prepared from 796 g of water glass ($SiO_2/NaOH/H_2O = 29/9/62$ in weight ratio) and 510 cc of water. Furthermore solution C was prepared by dissolving 271.8 g of sodium chloride into 1,080 cc of water. Both the solutions A and B were added little by little to the solution C while sufficiently agitating them in such a manner that the pH of the resulting mixed solution was within a range of 9.5 to 10.0 by adjusting the dropping amount, whereby an aqueous gelled mixture was obtained.

A stainless steel autoclave having 5-l internal volume was charged with the gelled mixture and sealed, and thereafter heated and agitated at 150° C. for 16 hours.

A white powdery reaction product was filtered off and washed, dried at 120° C. for 5 hours, and further the reaction product thus treated was calcined at 500° C. for 5 hours. The X-ray diffraction diagram of the product after calcination had the same peak patterns as those of Table 1. As a result of analysis of composition of the product, the $SiO_2/Al_2O_3$ (molar ratio) was 42.

The zeolite powder thus obtained was warmed to 90° C. with 1N aqueous ammonium chloride solution, and the solution was subjected to ion exchange for 1 hour, filtered and washed, and thereafter these operations were repeated three times. Then, the zeolite product was sufficiently washed with distilled water, and dried overnight at 120° C. The zeolite thus dealkalized was compression molded into pellets of $3 \times 4$ mm$\phi$, and these pellets were calcined at 500° C. for 8 hours to obtain catalyst F. On one hand, catalyst G was prepared in accordance with such manner except that 10 wt % of aluminum trifluoride was added to and mixed with the same dealkalized zeolite with that described above, the resulting mixture was compression molded into pellets of $3 \times 4$ mm$\phi$, and these pellets were calcined at 500° C. for 8 hours.

Dewaxing reaction of desulfulized vacuum gas oil was effected under standard reaction conditions by the use of catalysts F and G.

The reaction temperature wherein pour point of 165° C. or more fraction in the 10th day after starting the reaction becomes −15° C., the yield of the 165° C. or more fraction, the such rate of reaction temperature rise required for maintaining said pour point were as follows:

|  | Comparative Example 3 | Example 5 |
|---|---|---|
| Catalyst | F | G |
| Reaction Temperature (°C.) | 350 | 320 |
| Rate of Reaction Temperature (°C./day) | 5.0 | 2.0 |
| Yield of 165° C. or | 82.1 | 86.5 |

|  | Comparative Example 3 | Example 5 |
|---|---|---|
| More Fraction (wt %) | | |

The composite catalyst G comprising the zeolite and aluminum trifluoride exhibits a lower rate of reaction temperature rise for compensating the decrease in activity due to deposition of coke-like material and a higher yield of 165° C. or more dewaxed oil than those of the case where catalyst F is used. Thus, it is found that catalyst G has long life and is excellent in selectivity with respect to dewaxed oil.

COMPARATIVE EXAMPLE 4, EXAMPLE 6

Solution A was prepared from 29.31 g of aluminum sulfate $Al_2(SO_4)_3 \cdot 18H_2O$, 64.0 g of concentrated sulfuric acid, 42 g of $(n-C_3H_7)_4NBr$, and 621 cc of water, whilst solution B was prepared from 731 g of water glass ($SiO_2/NaOH/H_2O = 29/9/62$ in weight ratio) and 469 cc of water. Furthermore solution C was prepared by dissolving 271.8 g of sodium chloride into 1,080 cc of water. Both the solutions A and B were added little by little to solution C while sufficiently agitating them in such a manner that the pH of the resulting mixed solution was within a range of 9.5 to 10.0 by adjusting the dropping amount, whereby an aqueous gelled mixture was obtained.

A stainless steel autoclave having 5-l internal volume was charged with the gelled mixture and sealed, and thereafter heated and agitated at 150° C. for 16 hours.

A white powdery reaction product was filtered off and washed, dried at 120° C. for 5 hours, and further the reaction product thus treated was calcined at 500° C. for 5 hours. The X-ray diffraction diagram of the product after calcination had the same peak patterns as those of Table 1. As a result of analysis of composition of the product, the $SiO_2/Al_2O_3$ (molar ratio) was 63.

The zeolite powder thus obtained was warmed to 90° C. with 1N aqueous ammonium chloride solution, and the solution was subjected to ion exchange for 1 hour, filtered and washed, and thereafter these operations were repeated three times. Then, the zeolite product was sufficiently washed with distilled water, and dried overnight at 120° C. The zeolite thus dealkalized was compression molded into pellets of 3×4 mmφ, and these pellets were calcined at 500° C. for 8 hours to obtain catalyst H. On one hand, catalyst I was prepared in accordance with such manner except that 10 wt % of aluminum trifluoride were added to and mixed with the same dealkalized zeolite with that described above, the resulting mixture was compression molded into pellets of 3×4 mmφ, and these pellets were calcined at 500° C. for 8 hours.

Dewaxing reaction of desulfulized vacuum gas oil was effected under standard reaction conditions by the use of catalysts H and I.

The reaction temperature wherein pour point of 165° C. or more fraction in the 10th day after starting the reaction becomes −15° C., the yield of the 165° C. or more fraction, and the rate of reaction temperature rise required for maintaining said pour point were as follows:

|  | Comparative Example 4 | Example 6 |
|---|---|---|
| Catalyst | H | I |
| Reaction Temperature (°C.) | 350 | 325 |
| Rate of Reaction Temperature (°C./day) | 5.0 | 2.5 |
| Yield of 165° C. or More Fraction (wt %) | 81.9 | 85.8 |

The composite catalyst I comprising the zeolite and aluminum trifluoride exhibits a lower rate of temperature rise and a higher yield of 165° C. or more dewaxed oil than those of the case where catalyst H is used. Thus, it is found that catalyst I has long life and is excellent in selectivity with respect to dewaxed oil.

EXAMPLE 7

Desulfurized vacuum gas oil was dewaxed while flowing nitrogen in place of hydrogen in Example 5.

The reaction temperature wherein pour point of 165° C. or more fraction in the 10th day after starting the reaction becomes −15° C., the yield of the 165° C. or more fraction, and the rate of reaction temperature rise required for maintaining said pour point were as follows.

|  | Example 7 | Example 5 (Reference) |
|---|---|---|
| Catalyst | G | G |
| Reaction Temperature (°C.) | 330 | 320 |
| Rate of Reaction Temperature (°C./day) | 3.0 | 2.0 |
| Yield of 165° C. or More Fraction (wt %) | 86.8 | 86.5 |
| Gas | Nitrogen | Hydrogen |

It is found that when hydrogen gas is replaced by nitrogen gas, the catalyst life is shortened, but yield of the dewaxed oil becomes somewhat better.

EXAMPLE 8

Catalyst G of Example 5 was dipped into aqueous silver nitrate solution so as to contain 5 wt % of metallic silver, the catalyst G thus dipped was dried at 120° C. for 8 hours, and calcined at 500° C. for 8 hours to obtain catalyst J.

Dewaxing reaction of desulfulized vacuum gas oil was effected under standard reaction conditions by the use of catalyst J.

The reaction temperature wherein pour point of 165° C. or more fraction in the 10th day after starting the reaction becomes −15° C., the yield of the 165° C. or more fraction, and the rate of reaction temperature rise required for maintaining said pour point were as follows.

|  | Example 8 | Example 5 (Reference) |
|---|---|---|
| Catalyst | J | G |
| Reaction Temperature (°C.) | 315 | 320 |
| Rate of Reaction Temperature (°C./day) | 1.5 | 2.0 |
| Yield of 165° C. or | 84.1 | 86.5 |

When silver having hydrogenation capability is supported on the catalyst, the catalyst life becomes longer, but yield of the dewaxed oil decreases.

EXAMPLE 9

Nickel was supported on the dealkalized zeolite in Comparative Example 3 and Example 5 by the use of an aqueous nickel nitrate solution in accordance with an ion exchange process so that the content of the nickel therein might be 1.1 wt % in terms of metallic nickel. Afterward, the zeolite was dried at 120° C. for 8 hours and was then calcined at 500° C. for 8 hours. Further, 10 wt % of aluminum trifluoride was added to and mixed with this zeolite. The zeolite was then compression molded into pellets of 3×4 mm$\phi$, and these pellets were calcined at 500° C. for 8 hours to obtain catalyst K.

Dewaxing reaction of desulfulized vacuum gas oil was effected under standard reaction conditions by the use of catalyst K.

The reaction temperature wherein pour point of 165° C. or more fraction in the 10th day after starting the reaction becomes −15° C., the yield of 165° C. or more fraction, and the rate of reaction temperature rise required for maintaining said pour point were as follows.

|  | Example 9 | Example 5 (Reference) |
|---|---|---|
| Catalyst | K | G |
| Reaction Temperature (°C.) | 310 | 320 |
| Rate of Reaction Temperature (°C./day) | 1.0 | 2.0 |
| Yield of 165° C. or More Fraction (wt %) | 84.5 | 86.5 |

When nickel having hydrogenation capability is supported on the catalyst, the catalyst life becomes longer, but yield of the dewaxed oil decreases.

The undermentioned examples and comparative examples are connected with a dewaxing technique of a base oil for lubricating oil. Standard conditions for dewaxing were as follows.

| Reaction Pressure (kg/cm$^2$G) | 40 |
|---|---|
| LHSV (hr$^{-1}$) | 0.5 |
| Hydrogen Flow Rate (SCF/bbl) | 2,500 |

Reaction temperature was set such that the pour point of 270° C. or more distilled oil was −35° C. However, in order to maintain the pour point at a constant level, it was necessary to gradually elevate the reaction temperature. As a raw material oil, a reduced pressure gas oil having the following properties was employed, the gas oil being purified by the extraction of furfural and then by hydrogenation.

| Specific Gravity (15/4° C.) | | 0.8334 |
|---|---|---|
| Pour Point (°C.) | | +10 |
| Viscosity Index | | 104 |
| Sulfur Content (wt %) | | 0.1 |
| Boiling Range | 10% | 288 |
| | 50% | 346 |
| | 90% | 385 |

COMPARATIVE EXAMPLE 5 AND EXAMPLE 10

In Comparative Example 5, the above-mentioned base oil for lubricating oil was dewaxed by the use of the same catalyst F as in Comparative Example 3. In Example 10, the base oil for lubricating oil was dewaxed by the use of catalyst L which had been obtained by adding 20 wt % of aluminum trifluoride to the dealkalized zeolite in Comparative Example 3 and Example 5, followed by mixing, compression molding the zeolite into pellets of 3×4 mm$\phi$, and calcining these pellets at 540° C. for 8 hours.

Such reaction temperature wherein pour point of 270° C. or more fraction in the 10th day after starting the reaction becomes −35° C., yield and viscosity index (VI) of the 270° C. or more fraction, and such rate of reaction temperature rise required for maintaining said pour point were as follows:

|  | Comparative Example 5 | Example 10 |
|---|---|---|
| Catalyst | F | L |
| Reaction Temperature (°C.) | 335 | 305 |
| Rate of Reaction Temperature (°C./day) | 4.5 | 1.5 |
| Yield of 270° C. or More Fraction (wt %) | 68.8 | 73.8 |
| Viscosity Index (VI) of 270° C. or More Fraction | 83 | 90 |

The composite catalyst L comprising the zeolite and aluminum trifluoride exhibits a lower rate of reaction temperature rise for compensating the decrease in activity due to deposition of coke-like material and a higher yield and viscosity index of 270° C. or more dewaxed oil than those of the case where catalyst F is used. Thus, it is found that catalyst L has long life and is excellent in selectivity with respect to dewaxed oil.

COMPARATIVE EXAMPLE 6 AND EXAMPLE 11

In Comparative Example 6, the above-mentioned base oil for lubricating oil was dewaxed by the use of the same catalyst C as in Comparative Example 2. In Example 11, the above-mentioned base oil for lubricating oil was dewaxed by the use of catalyst M which had been obtained by adding 20 wt % of ammonium fluoride to the dealkalized zeolite in Comparative Example 2 and Example 2, followed by mixing, compression molding the zeolite into pellets of 3×4 mm$\phi$, and calcining these pellets at 540° C. for 8 hours.

The reaction temperature wherein pour point of 270° C. or more fraction in the 10th day after starting the reaction becomes −35° C., the yield and viscosity index (VI) of the 270° C. or more fraction, and the rate of reaction temperature rise required for maintaining said pour point were as follows:

|  | Comparative Example 6 | Example 11 |
|---|---|---|
| Catalyst | C | M |
| Reaction Temperature (°C.) | 325 | 305 |
| Rate of Reaction Temperature (°C./day) | 4.5 | 1.5 |
| Yield of 270° C. or More Fraction (wt %) | 68.5 | 73.1 |
| Viscosity Index (VI) of 270° C. or More Fraction | 83 | 89 |

The composite catalyst M comprising the zeolite and ammonium fluoride exhibits a lower rate of temperature rise and a higher yield and viscosity index of 270° C. or more dewaxed oil than those of the case where catalyst C is used. Thus, it is found that catalyst M has long life and is excellent in selectivity with respect to dewaxed oil.

EXAMPLE 12

Nickel was supported on the dealkalized zeolite in Comparative Example 3 and Example 5 by the use of an aqueous nickel nitrate solution in accordance with an ion exchange process so that the content of the nickel therein might be 0.8 wt % in terms of metallic nickel. Afterward, the zeolite was dried at 120° C. for 8 hours and was then calcined at 500° C. for 8 hours. Further, 20% of aluminum trifluoride was added to this zeolite, followed by mixing. The zeolite was then compression molded into pellets of $3 \times 4$ mm$\phi$, and these pellets were calcined at 540° C. for 8 hours to obtain catalyst N. The above-mentioned base oil for lubricating oil was dewaxed by the use of this catalyst N.

The reaction temperature wherein pour point of 270° C. or more fraction in the 10th day after starting the reaction becomes −35° C., the yield and viscosity index (VI) of 270° C. or more fraction, and the rate of reaction temperature rise required for maintaining said pour point were as follows.

|  | Example 12 | Example 10 (Reference) |
|---|---|---|
| Catalyst | N | L |
| Reaction Temperature (°C.) | 300 | 305 |
| Rate of Reaction Temperature (°C./day) | 1.0 | 1.5 |
| Yield of 270° C. or More Fraction (wt %) | 72.5 | 73.8 |
| Viscosity Index (VI) of 270° C. or More Fraction | 90 | 90 |

When nickel having hydrogenation capability is supported on the catalyst, the catalyst life becomes longer, but yield of the dewaxed oil decreases.

What is claimed is:

1. A method for dewaxing hydrocarbon oil which is characterized by bringing said hydrocarbon oil into contact with a catalyst which is prepared by mixing a crystalline aluminosilicate having an $SiO_2/Al_2O_3$ molar ratio between 12 and less than 70 with at least one solid fluorine compound selected from aluminum fluoride, ammonium fluoride, zinc fluoride, cadmium fluoride, manganese fluoride, chromium fluoride, tin fluoride, copper fluoride and silver fluoride; molding the resulting mixture; and calcining the molded mixture at a temperature of 100° to 700° C. for a time of 0.5 hour or more; said crystalline aluminosilicate being obtained by exposing a gelled reaction mixture consisting of a silica source, an alumina source, an alkali source, water and an organic compound in the molar composition ratio $SiO_2/Al_2O_3 = 10$ to $100$ $H_2O/SiO_2 = 5$ to $100$ $OH^-/SiO_2 = 0.01$ to $1.0$ $R/Al_2O_3 \geq 0.05$ wherein R is said organic compound, to hydrothermal synthetic conditions of a reaction temperature of 50° to 300° C. for a reaction time of 3 hours to 1 month.

2. A method for dewaxing hydrocarbon oil as claimed in claim 1 wherein said hydrocarbon oil is brought into contact with said catalyst in the presence of hydrogen.

3. A method for dewaxing hydrocarbon oil as claimed in claim 1 wherein said fluorine compound is aluminum fluoride or ammonium fluoride.

4. A method for dewaxing hydrocarbon oil as claimed in claim 1 wherein a metal having hydrogenation capability is supported on said catalyst.

5. A method for dewaxing hydrocarbon oil as claimed in claim 1 wherein said organic compound has at least one hydrophilic functional group in the molecule.

6. A method for dewaxing hydrocarbon oil as claimed in claim 1 wherein said crystalline aluminosilicate has an $SiO_2/Al_2O_3$ molar ratio ranging from 10 to less than 100.

7. A method for dewaxing hydrocarbon oil as claimed in claim 1 wherein said reaction mixture is maintained at 100° to 200° C. for 5 hours to 5 days and wherein said molded mixture is calcined at 300° to 600° C. for 1 to 24 hours.

8. A method for dewaxing hydrocarbon oil as claimed in claim 7 wherein said mixture contains 20 to 99 wt % of said aluminosilicate and 1 to 80 wt % of said fluorine compound.

9. A method for dewaxing hydrocarbon oil as claimed in claim 8 wherein said mixture contains 40 to 90% of said aluminosilicate and 10 to 60% of said fluorine compound.

10. A method for dewaxing hydrocarbon oil as claimed in claim 9 wherein said hydrocarbon oil is brought into contact with said catalyst at a reaction pressure of 1 to 100 kg/cm$^2$ and a liquid hourly space velocity of 0.1 to 10 hr$^{-1}$ in the presence of hydrogen and at a ratio of hydrogen to hydrocarbon of 100 to 1,500 Nm$^3$/m$^3$.

11. A method for dewaxing hydrocarbon oil as claimed in claim 10 wherein said reaction pressure is 20 to 50 kg/cm$^2$, said liquid hourly space velocity is 0.5 to 5 hr$^{-1}$, and said ratio of hydrogen to hydrocarbon is 200 to 800 Nm$^3$/m$^3$.

12. A method for dewaxing hydrocarbon oil as claimed in claim 11 wherein a metal having hydrogenation capacity is supported on said catalyst.

13. A method for dewaxing hydrocarbon oil as claimed in claim 12 wherein said metal is selected from the group consisting of platinum, palladium, ruthenium, rhenium, nickel, rhodium, osmium, iridium, silver, copper, zinc, vanadium, chromium, iron, cobalt, cadmium, tin, manganese, tungsten, molybdenum, boron, titanium and gallium.

14. A method for dewaxing hydrocarbon oil as claimed in claim 7 wherein said fluorine compound is aluminum fluoride or ammonium fluoride.

15. A method for dewaxing hydrocarbon oil as claimed in claim 24 wherein said mixture contains 40 to 90% of said aluminosilicate and 10 to 60% of said fluorine compound.

16. A method for dewaxing hydrocarbon oil as claimed in claim 15 wherein said crystalline aluminosilicate has an X-ray diffraction pattern of:

| 2θ (degree) | Lattice Plane Distance d(Å) |
|---|---|
| 7.76 | 11.36 |
| 8.67 | 10.20 |
| 8.93 | 9.90 |
| 9.68 | 9.14 |
| 11.73 | 7.54 |
| 12.34 | 7.17 |

-continued

| 2θ (degree) | Lattice Plane Distance d(A) |
|---|---|
| 13.03 | 6.79 |
| 14.61 | 6.06 |
| 15.36 | 5.77 |
| 15.73 | 5.63 |
| 16.35 | 5.42 |
| 17.08 | 5.19 |
| 17.56 | 5.05 |
| 19.03 | 4.65 |
| 20.19 | 4.40 |
| 20.68 | 4.30 |
| 21.59 | 4.12 |
| 22.01 | 4.04 |
| 22.96 | 3.87 |
| 23.14 | 3.84 |
| 23.60 | 3.77 |
| 23.77 | 3.74 |
| 24.58 | 3.62 |
| 25.44 | 3.50 |
| 25.71 | 3.46 |
| 26.75 | 3.33 |
| 27.26 | 3.27 |
| 29.11 | 3.07 |
| 29.76 | 3.00 |

17. A method for dewaxing hydrocarbon oil as claimed in claim 16 wherein a metal having hydrogenation capacity is supported on said catalyst.

18. A method for dewaxing hydrocarbon oil as claimed in claim 1 wherein said crystalline aluminosilicate has an X-ray diffraction pattern of:

| 2θ (degree) | Lattice Plane Distance d(A) |
|---|---|
| 7.76 | 11.36 |
| 8.67 | 10.20 |
| 8.93 | 9.90 |
| 9.68 | 9.14 |
| 11.73 | 7.54 |
| 12.34 | 7.17 |
| 13.03 | 6.79 |
| 14.61 | 6.06 |
| 15.36 | 5.77 |
| 15.73 | 5.63 |
| 16.35 | 5.42 |
| 17.08 | 5.19 |
| 17.56 | 5.05 |
| 19.03 | 4.65 |
| 20.19 | 4.40 |
| 20.68 | 4.30 |
| 21.59 | 4.12 |
| 22.01 | 4.04 |
| 22.96 | 3.87 |
| 23.14 | 3.84 |
| 23.60 | 3.77 |
| 23.77 | 3.74 |
| 24.58 | 3.62 |
| 25.44 | 3.50 |
| 25.71 | 3.46 |
| 26.75 | 3.33 |
| 27.26 | 3.27 |
| 29.11 | 3.07 |
| 29.76 | 3.00 |

* * * * *